United States Patent [19]

Recht

[11] 4,031,860
[45] June 28, 1977

[54] ARRANGEMENT FOR REDUCING THE NOX CONTENT OF FLUID GASES

[75] Inventor: Heinz Recht, Oberhausen, Rhld., Germany

[73] Assignee: Deutsche Babcock & Wilcox Aktiengesellschaft, Germany

[22] Filed: Feb. 2, 1976

[21] Appl. No.: 654,345

[30] Foreign Application Priority Data

Feb. 3, 1975 Germany .................. 2504418

[52] U.S. Cl. ...................................... 122/240 B
[51] Int. Cl.² ........................................ F22B 31/04
[58] Field of Search ........ 122/240 R, 240 A, 240 B

[56] References Cited
UNITED STATES PATENTS

| | | | |
|---|---|---|---|
| 2,330,188 | 9/1943 | Barnes | 122/240 R X |
| 3,043,279 | 7/1962 | Blomquist | 122/240 R |
| 3,254,635 | 6/1966 | Schoppe | 122/240 R |

Primary Examiner—Robert G. Nilson
Attorney, Agent, or Firm—McGlew and Tuttle

[57] ABSTRACT

The arrangement is for reducing $NO_x$ content in the flue gas of a single stage combustion boiler, with a combustion chamber defined by tubular water walls and having plural burners, fired by liquid or gaseous fuel, mounted through one wall, with the combustion chamber communicating with the flue gas duct adjacent an opposite wall. The $NO_x$ content of the flue gases is reduced by dividing the combustion chamber into sections, each respective to a single burner, by gas-tight partitions, formed of water tubes, extending axially of the burner between the burner mounting wall and transition zone to the flue gas duct. The tubes of the partition may communicate with drums to which the tubular water walls are connected, and may communicate with the tubular water walls.

7 Claims, 6 Drawing Figures

ARRANGEMENT FOR REDUCING THE NOX CONTENT OF FLUID GASES

FIELD AND BACKGROUND OF THE INVENTION

This invention relates to the reduction of the $NO_x$ content in the flue gas of single stage combustion boilers equipped with plural burners fired by liquid or gaseous fuel.

Nitric oxides ($NO_x$) are produced, during the combustion of fossil fuels, by oxidation of NO, which is harmless in itself. They may originate in the atmospheric nitrogen or in the nitrogen contained in the fuel. Since, in greater concentration, nitric oxides are noxious to animal and human life, every effort is made to keep their content in the air reduced below a definite maximum value.

For reducing the $NO_x$ content, it is well known to lower the flame temperature and/or to adjust a near stoichiometric air-to-fuel ratio. One means for lowering the flame temperature is flue gas recirculation, during which cooler flue gas is introduced into the combustion space for cooling the flame. The formation of $NO_x$, however, may also be limited by reducing the amount of excess air during combustion. This is provided in two-stage combustion where, in the first stage, the combustion takes place with a deficiency of air. Thereby, the flame temperature is limited and, between the first and the second stage, the gases are cooled before the combustion is terminated.

Although both of these methods reduce the $NO_x$ content in the flue gas, they have other disadvantages. They lead to an entrainment of unburned ccomponents and diminish the efficiency of the plant, and also require higher expenditures for construction and control.

Up to date, constructional measures have not led to an effective reduction of the $NO_x$ content. According to a study published some time ago, a particular positioning of the burners (corner or front firing) has little influce on the $NO_x$ content. Even though smaller boilers show a smaller $NO_x$ content in the flue gases than large ones, the content of $NO_x$ in the waste gases of small boilers is more dangerous since it does not pass into the atmosphere through high chimneys.

SUMMARY OF THE INVENTION

The present invention is directed to the reduction of the $NO_x$ content in the flue gases of oil-fired or gas-fired boilers with the aid of simple means, i.e. without providing a two-stage combustion or a flue gas circulation. At the same time, the observance of a near stoichiometric combustion is assured.

In accordance with the invention, the combustion chamber is divided, by gas-tight partitions assembled of tubes and extending up to the transition zone to the flue gas duct and in the axial direction of the burners, into sections, and each section is associated with a single burner. The tubes of the partitions may communicate directly with the tubes of the outer walls of the combustion chamber.

By providing the built-in partitions, the combustion chamber can be sectioned so that the flame is cooled all around. This all-around cooling reduces the flame temperature and, thereby, the $NO_x$ content. This makes it possible to obtain the same good results as with fire-tube boilers, which are known for their low $NO_x$ contents. Aside from mounting the partitions, no further changes have to be made on the boilers. Thus, the partitions can be mounted in boilers of standard construction without any adaptation.

An object of the invention is to reduce the nitric oxide ($NO_x$) content of flue gases of boilers fired by oil or gas, with the aid of simple means.

Another object of the invention is to reduce the $NO_x$ content of the flue gases in single stage combustion boilers.

A further object of the invention is to reduce the $NO_x$ content of flue gases without flue gas recirculation.

Yet another object of the invention is to reduce the $NO_x$ content of flue gases while providing a substantially stoichiometric combustion of the fuel.

For an understanding of the principles of the invention, reference is made to the following description of typical embodiments thereof as illustrated in the accompanying drawings.

DESCRIPTION OF THE PREFERRED EMBODIMENTS

Figure 1:
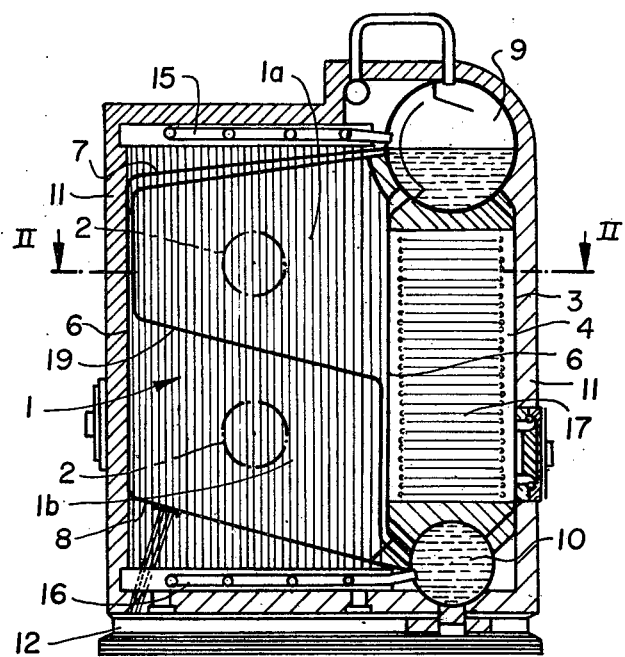
FIG. 1 is a longitudinal sectional view of a boiler comprising the arrangement in accordance with the invention.
Figure 2:
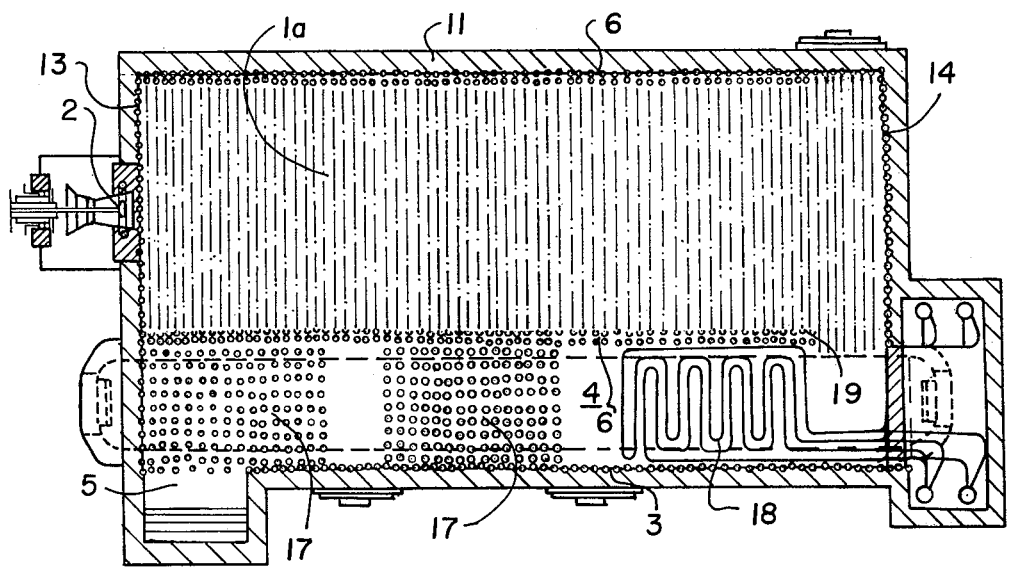
FIG. 2 is a sectional view taken along the line II—II of FIG. 1.
Figure 3:
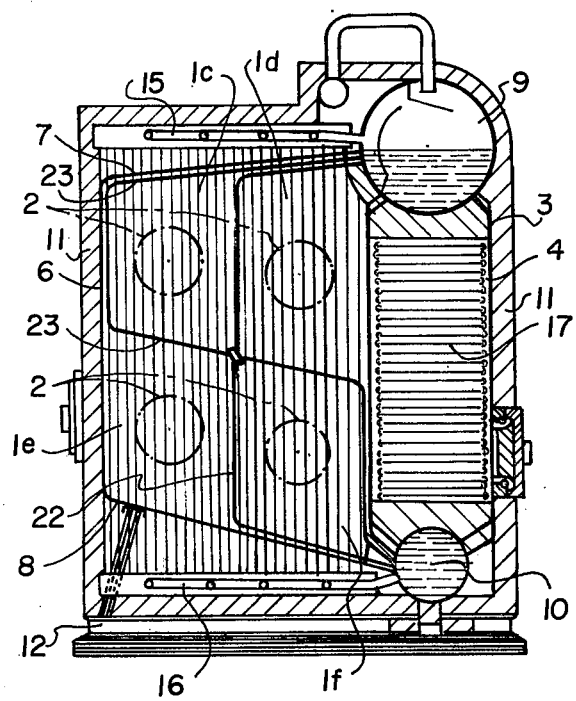
FIG. 3 is a view, similar to FIG. 1, of another embodiment of the invention.

The boiler shown in FIG. 1 to 3 is a so-called boiler with integral furnace and comprises a combustion chamber 1 and a plurality of well-known, oil-fired or gas-fired burners 2, for example, y-jet type oil burners, mounted in the front wall 13 of the boiler. The gases leaving combustion chamber 1 flow into a flue gas duct 4, which is provided alongside combustion chamber 1 and limited by tube walls 3. From duct 4, the gases pass through outlet 5 into the stack.

The water tubes of combustion chamber 1 are gas-tightly welded to one another and form the vertical side walls 6 as well as the ceiling 7 and the floor 8 of the combustion chamber. They are connected to an upper drum 9 and a lower drum 10. On its exterior, combustion chamber 1 and flue gas duct 4 are surrounded by a heat insulation layer 11. The whole boiler is supported on a base frame 12.

The front wall 13 and back wall 14 of combustion chamber 1 are also formed of water tubes which are gas-tightly welded together. Each of the walls is connected to respective headers 15 and 16, of which the upper one is connected to upper drum 9 and the lower one to lower drum 10.

In the case of a hot-water or saturated-steam boiler, ancillary heating surfaces 17, such as feed-water preheaters, are accommodated in duct 4, and designed as a convection tube bank. In a superheated-steam boiler, a part of the mentioned heating surfaces is replaced by a superheater 18 which is designed as an extensible, horizontal, continuous loop tube bank.

As shown in FIG. 1, combustion chamber 1 is divided, by a partition 19, into two sections 1a and 1b of approximately equal size. Partition 19 is formed of tubes which also open into drums 9 and 10. Thus, they are connected to the same water circulation system as the tubes of combustion chamber walls 6, 7, 8. In particular, as may be seen in FIG. 1, tubes 19 extend from upper drum 9 in a direction parallel to the tubes forming the combustion-chamber ceiling 7, at a small distance therefrom, up to opposite side wall 6 of the combustion chamber. There, they extend parallel to and at a small distance from tubes 6. Close above the median plane of the combustion chamber, tubes 19 are bent again and extend obliquely through combustion chamber 1 to the other side wall 6 of the chamber, approximately in a direction parallel to floor 8 of the combustion chamber. Therefrom, they extend downwardly along side wall 6, at a small distance therefrom, and open into lower drum 10. The tubes of partition 19 are juxtaposed as closely as possible in order to avoid dead spaces between partition 19 and adjacent walls 6, 7, 8 of combustion chamber 1, where soot could become deposited. It is not absolutely necessary to weld tubes 19 to each other.

Figure 1A:
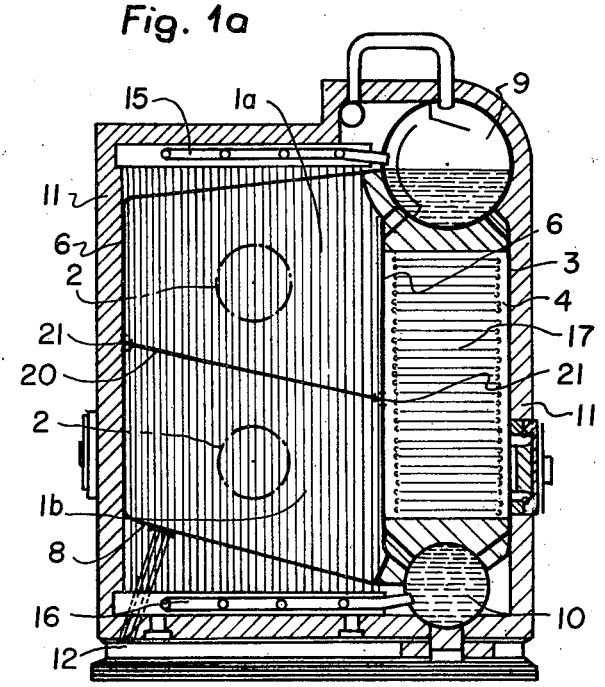
FIG. 1a is a similar sectional view of another embodiment.

In the variant shown in FIG. 1a, the tubes of partition 20 are not connected directly to drums 9 and 10, but terminate, through branch pieces 21, in the vertical side walls 6 of combustion chamber 1. This variant may be used also in the embodiments described hereinafter.

In each section 1a, 1b of combustion chamber 1, a single burner 2 is provided. In this manner, the flame of each burner 2 is completely surrounded by cooling tubes so that the flame temperatures are reduced. This enclosure extends over the whole length of combustion chamber 1 since, as shown in FIG. 2, partition 19 extends up into the transition zone of combustion chamber 1 to flue gas duct 4.

The boiler according to the embodiment of FIG. 3 comprises four burners 2 at the front side. Here, in conformity with the above mentioned principle, two partitions 22 and 23 are provided, which divide combustion chamber 1 into four sections 1c, 1d, 1e, 1f of approximately equal size. Each section is associated with a single burner 2. The tubes of partitions 22 and 23 again are tightly juxtaposed and connected to the same circulatory systems as the walls of the combustion chamber.

First, the tubes of partition 22 are bent in the same manner as tubes 19 of partition 19 shown in FIG. 1. However, at the center of combustion chamber 1, they are deflected vertically downwardly, again bent near the bottom and extend close above floor 8 of the combustion chamber and parallel thereto up to lower drum 10. The tubes of the other partition 23 extend from upper drum 9 in closely spaced relationship with and below the tubes of partition 22, and are then bent, at one half the length of ceiling 7 of the combustion chamber, vertically downwardly until they come about in contact with the tubes of partition 22 at the center of combustion chamber 1. Therefrom, they extend in the same manner as tubes 19 in FIG. 1. At the center of combustion chamber 1, the tubes of the two partitions 22 and 23 are connected to each other.

Figure 4:
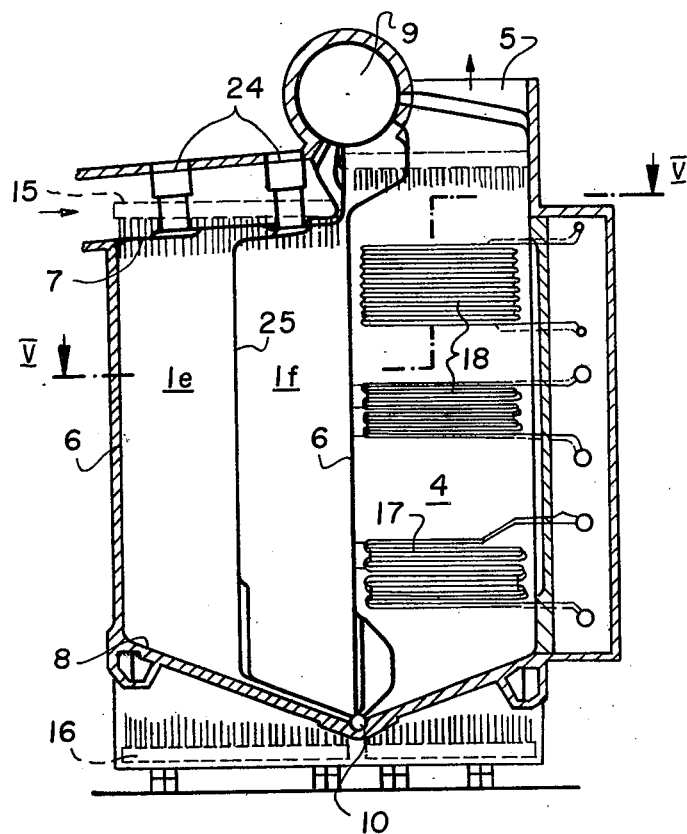
FIG. 4 is a longitudinal sectional view of a boiler with top firing.
Figure 5:
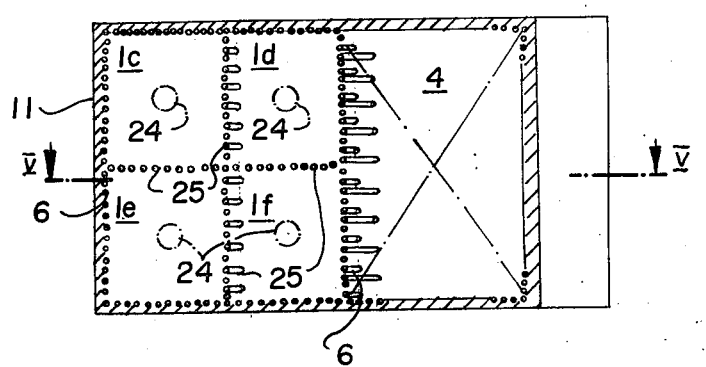
FIG. 5 is a sectional view taken along the line V—V of FIG. 4.

FIGS. 4 and 5 show a possibility of applying the invention to a radiant boiler comprising four top burners 24. The respective parts of the boiler corresponding, as to their function, to those of the boilers shown in FIGS. 1 to 3 are designated by the same reference numerals. The gases flowing through combustion chamber 1 in the vertical direction pass, in the lower part of combustion chamber 1 where tubes 6 are slightly separated, into flue gas duct 4 and flow through the same from below upwardly.

Four partitions 25 divide the combustion chamber into four sections of approximately the same size, of which each is associated with one top burner 24. In the bottom zone of combustion chamber 1, the adjacent tubes, which, otherwise, are tightly juxtaposed, are slightly spaced apart in order to permit the gases to pass into flue duct 4. Tubes 25 extend in combustion chamber 1 substantially in the same manner as tubes 19, 20, 22, 23, and are connected to upper and lower drums 9, 10 which, in this case, are designed as simple headers.

While specific embodiments of the invention have been shown and described in detail to illustrate the application of the principles of the invention, it will be understood that the invention may be embodied otherwise without departing from such principles.

What is claimed is:

1. An arrangement for reducing the $NO_x$ content in the flue gases of a single stage combustion boiler, with a combustion chamber defined by tubular water walls and having plural burners, fired by liquid or gaseous fuel, mounted through one wall, and communicating with a flue gas duct, separated from the combustion chamber by a transition zone, through a combustion gas flow opening, adjacent a wall opposite the burner mounting wall, connecting the combustion chamber to the flue gas duct, said arrangement comprising at least one substantially gas-tight partition, formed of water tubes, extending in the axial direction of the burners completely across said combustion chamber between the water walls thereof and said transition zone, and dividing said combustion chamber into sections each respective to a single burner and each communicating individually with said combustion gas flow opening; whereby the combustion gases, flowing through said sections from the respective burners to said combustion gas flow opening are in heat transfer contact with, and surrounded by, both the water walls of said combustion chamber and the water tubes of each said partition.

2. An arrangement as claimed in claim 1, in which said sections are substantially equal in size.

3. An arrangement as claimed in claim 1, in which the tubes of each partition communicate with a circulating system which includes the tubular water walls of said combustion chamber.

6. An arrangement as claimed in claim 1, in which the axes of said burners extend horizontally of said combustion chamber and said sections extend horizontally of said combustion chamber.

7. An arrangement as claimed in claim 1, in which the axes of said burners extend vertically of said combustion chamber and said sections extend vertically of said combustion chamber.

4. An arrangement as claimed in claim 3, in which the tubes of each partition communicate with headers connected to the tubular water walls of said combustion chamber.

5. An arrangement as claimed in claim 3, in which the tubes of each partition communicate directly with the tubular water walls forming the side walls of said combustion chamber.

* * * * *